United States Patent

Woodling

[15] 3,649,050
[45] Mar. 14, 1972

[54] TUBE FITTING CONNECTION

[72] Inventor: George V. Woodling, 22077 West Lake Road, Rocky River, Ohio 44116

[22] Filed: June 15, 1970

[21] Appl. No.: 46,339

[52] U.S. Cl. .............................. 285/12, 285/93, 285/334.5, 285/341
[51] Int. Cl. ........................................................ F16l 25/00
[58] Field of Search ..................... 285/12, 341, 382.7, 334.5, 285/342, 343, 93

[56] References Cited

UNITED STATES PATENTS

| 2,850,303 | 9/1958 | Bauer | 285/342 X |
| 2,309,596 | 1/1943 | Johnson | 285/382.7 X |
| 3,218,094 | 11/1965 | Bauer | 285/341 X |

FOREIGN PATENTS OR APPLICATIONS 957,532  8/1949  France..............................285/382.7

Primary Examiner—Dave W. Arola
Attorney—Woodling, Krost, Granger & Rust

[57] ABSTRACT

A double-ended sleeve for a tube fitting whereby the ends may be selectively interchangeable as a means for effecting a self-flare connection at the end of the tube to seal fluid pressure and as a means for effecting a collet-grip connection around the tube in advance of the self-flare connection to absorb tube vibrations. Both ends of the sleeve are of like construction and each end comprises a discontinuous annular body having at least slot means extending longitudinally thereof. Intermediate the two ends of the sleeve, is a continuous annular body portion having opposed clamping shoulders adapted for selectable engagement by the nut.

9 Claims, 7 Drawing Figures

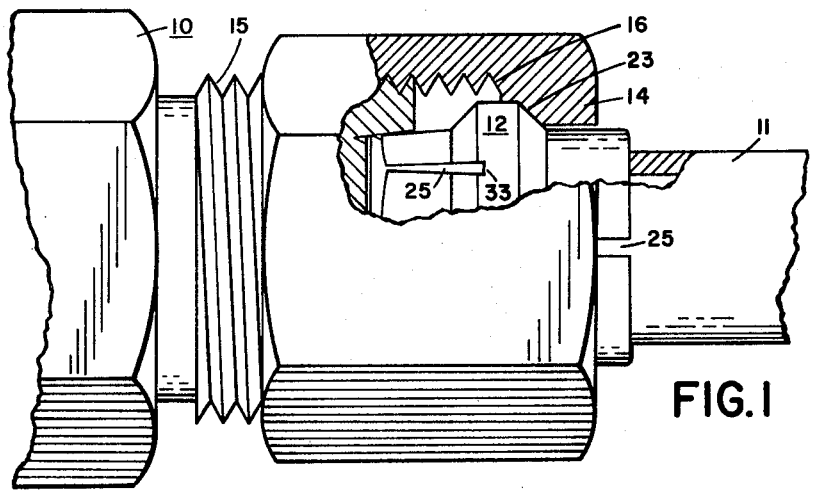
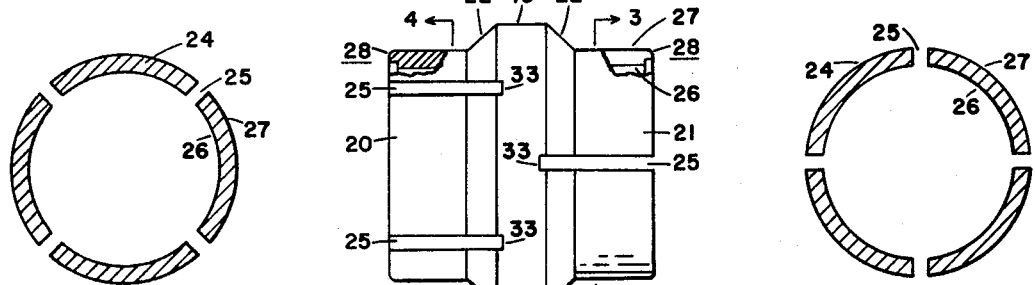
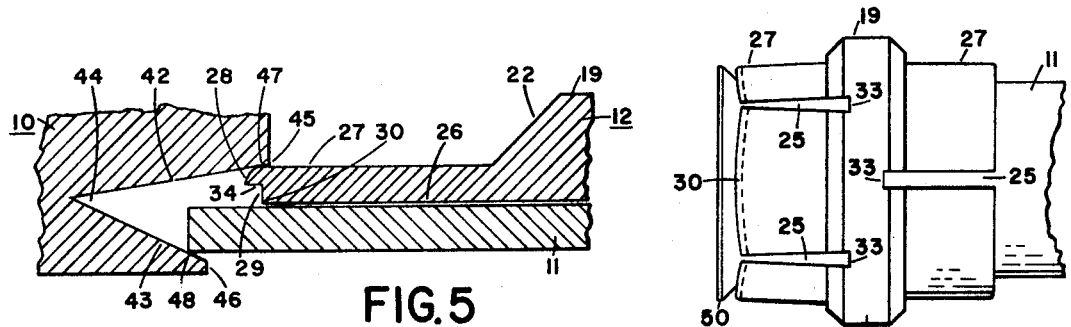
INVENTOR
GEORGE V. WOODLING
BY
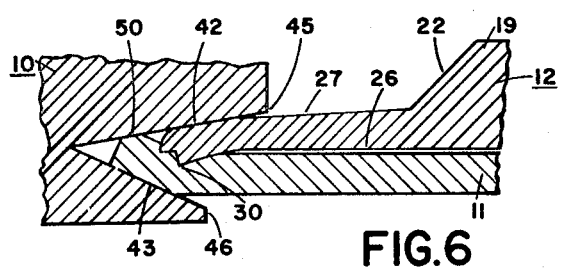

3,649,050

TUBE FITTING CONNECTION

BACKGROUND OF THE INVENTION

Many different tube fittings have been proposed to self-flare the end of the tube by the tightening of the nut. In these proposed connections, the nut is caused to encounter a considerable amount of resistance to tightening, particularly on the larger sizes. Then too, the sleeve which forms the self-flare connection is often mounted backwards, rendering the sleeve defective.

Accordingly, it is an object of my invention to provide a tube fitting connection whereby the nut turns-down easily and whereby the sleeve is precluded from being mounted backwards.

Another object is the provision of a sleeve having an annularly discontinuous contractable end portion adapted to self-flare the tube as the nut is tightened.

Another object is the provision of a double-ended sleeve, whereby the ends may be selectively interchangeable as a means for effecting a self-flare connection at the end of the tube to seal fluid pressure and as a means for effecting a collet-grip connection around the tube in advance of the self-flare connection to absorb tube vibrations.

Another object is where both the self-flare connection and the collet-grip connection have resilient fingers which provide a sustaining force reacting with the nut and thereby functioning as locking means to keep the nut from becoming loose.

SUMMARY OF THE INVENTION

The invention constitutes a tube fitting connection between a connection body and a tube-end portion of a tube having an inside and an outside annular surface, a sleeve having an annularly discontinuous contractable end portion beyond which said tube-end portion extends, said contractable end portion of said sleeve having an inside and an outside surface and an inner axial end surface including a radially extending edge surface meeting with the inside surface of said sleeve to define a biting edge lying in a transverse plane to the longitudinal axis of said sleeve and capable of biting into the outside surface of said tube-end portion for effecting a self-flare connection with said connection body, said connection body including an axially directed inwardly converging annular walled chamber having an outer cam wall and an inner wedge wall both sloping inwardly toward each other at an acute angle relative to the longitudinal axis of said connection body, the outer axial ends of said outer cam wall and said inner wedge wall having respectively diameters at least equal to the diameter of the outside surface of said contractable end portion at the inner axial end thereof and no greater than the diameter of the inside surface of said tube-end portion at the inner axial end thereof, said outer cam wall being axially longer than said wedge wall and extending outwardly therebeyond whereby with said inside surface of said tube-end portion engaging said wedge wall said outside surface of said contractable end portion of said sleeve will engage said cam wall at an initial contact place axially spaced outwardly from the inner axial end of said tube-end portion, said contractable end portion of said sleeve having at least slot means defined by opposed longitudinally extending side walls beginning at the inner axial end of the contractable end portion of said sleeve and terminating within the body thereof, said slot means rendering said biting edge annularly discontinuous, force means engaging said sleeve axially outwardly of said biting edge for forcing the outside surface of said contractable end portion of said sleeve against said cam wall and camming said tube-end portion against said wedge wall for self-flaring said tube-end portion into a self-flared tube-end portion, said wedge wall supporting said self-flared tube-end portion in opposition to said camming force, said force means with said annularly discontinuous contractable end portion of said sleeve engaging said self-flared tube-end portion forcing said self-flared tube-end portion against said wedge wall for effecting a wedge fluid seal therebetween, said wedge fluid seal effectively sealing high fluid pressures even though said self-flared tube-end portion is forced against said wedge wall by said annularly discontinuous contractable end portion of said sleeve.

Another object is the provision of a lateral stepped edge at the juncture of the spring fingers and the camming shoulders to give more resiliency to the fingers.

Other objects and a fuller understanding of this invention may be had by referring to the following description and claims, taken in conjunction with the accompanying drawings, in which:

BRIEF DESCRIPTION OF THE DRAWINGS

FIG. 1 is a longitudinal side view of a tube fitting embodying the features of my invention with a portion shown in section to illustrate the location of the sleeve, the view being drawn to substantially three times scale for a ½-inch tube fitting;

FIG. 2 is a longitudinal side view of my sleeve in FIG. 1 with portions shown in section to show the terminal biting edge of the sleeve;

FIG. 3 is a cross section of the sleeve, taken along the line 3—3 thereof;

FIG. 4 is a cross section of the sleeve, taken along the line 4—4 thereof;

FIG. 5 is an enlarged fragmentary view of my tube fitting connection, showing the relationship of the parts in readiness for assembly, the view being drawn to substantially 8 times scale for a ½-inch tube fitting;

FIG. 6 is an enlarged fragmentary view of my tube fitting connection, showing the relationship of the assembled parts, the view being drawn to substantially eight times scale for a ½-inch tube fitting; and FIG. 7 is a side view of my sleeve mounted around the end of a tube and shows a modification, in that there is a laterally stepped edge at the juncture between the segmental fingers and the clamping shoulders.

DESCRIPTION OF THE PREFERRED EMBODIMENT

With reference to the drawings, my tube coupling connection comprises a connection body 10, a tube 11 having a tube-end portion adapted to be connected thereto, a contractable sleeve 12 having a bore to closely receive the tube, and a nut 14 which is adapted to press the contractable end portion of the sleeve into the connection body and hold the assembly together. The right-hand end of the connection body 10 is provided with male threads 15 which are threadably engaged by female threads 16 of the nut.

The sleeve 12 is double-ended and comprises a central body portion 19, a forward or inner end portion 20 and a rearward or outer end portion 21. The central body portion 19 is annularly continuous and the two end portions are annularly discontinuous. The two end portions are preferably identical and may be reversibly mounted, end-for-end, on the tube. In this application, the portion 20 will be referred to as the forward or inner end portion and the portion 21 will be referred to as the rearward or outer end portion, being the position shown in the drawings. The same reference characters apply to both end portions of the sleeve, since they are of like construction.

In the drawings, the inner end portion 20 functions as a selectable contractable end portion to bite the tube for making a self-flare connection therewith and the outer end portion 21 functions as a selectable collet-grip portion to make a soft flexible grip with the tube in advance of the self-flare connection for absorbing tube vibrations and fluid shocks. The selectable contractable end portion 20 has a first clamping shoulder terminating on one side of the central body portion 19 and the selectable collet-grip portion 21 has a second clamping shoulder terminating on the other side of the central body portion. The clamping shoulders oppose each other and constitute opposed selectable clamping shoulders. Both are identified by the reference character 22. The selected one of the clamping shoulders is adapted to be engaged by an abutment shoulder 23 provided on the inside of the nut 14 for pressing the selectable contractable end portion of the sleeve into the connection body 10 and for holding the assembly together.

The two end portions of the sleeve respectively comprise a plurality of segmental spring fingers 24 which grip the tube. The spring fingers 24 may comprise any number, four being shown in FIG. 3 of the drawings, and are made by providing longitudinally extending slots 25 in the sleeve at annular intervals thereabout. The slots 25 are defined by opposed longitudinally extending side walls which terminate at a place 33 in the central body portion of the sleeve, whereby when the nut 14 is tightened, the spring fingers 24 are flexed radially against the tube. As shown in FIG. 7, a laterally stepped edge may be provided at the juncture between the spring fingers 24 and the clamping shoulders 22 to give more resiliency and less direct clamping pressure against the tube at the collet-grip connection.

The sleeve is preferably constructed of material having a hardness value greater than that of the insertable tube. For steel fittings, the material may comprise A1S1, P20 steel.

As illustrated, the slots in the forward or inner end portion 20 and the slots in the rearward or outer end portion 21 are circumferentially staggered with respect to each other, otherwise they are preferably identical. Both end portions of the sleeve have an inside surface 26, an outside surface 27, and an inner axial end surface 28 including a radially extending edge surface 29 meeting with the inside surface 26 to define a biting edge 30 lying in a transverse plane to the longitudinal axis of the sleeve. When the sleeve is cammed into the connection body 10, the biting edge 30 is capable of biting into the outside surface of the tube for effecting a self-flare connection therewith. Extending axially away from the biting edge 30, is a short extension wall 34 over-lying the tube 11, which tends to limit the extent that the sleeve may bite into the tube. The extension wall 34 is annularly discontinuous.

The connection body 10 has an axially directed inwardly converging annular walled chamber having an outer cam wall 42 and an inner wedge wall 43 both sloping inwardly toward each other at an acute angle relative to the longitudinal axis of the body. The outer cam wall 42 and the inner wedge wall 43 at their inner axial ends meet with each other and define an annular terminal end portion 44. The outer axial end 45 of the outer cam wall 42 and the outer axial end 46 of the inner wedge wall 43 respectively have diameters at least equal to the outside diameter 27 of the contractable end portion of the sleeve and no greater than the diameter of the inside surface of the tube-end portion at the inner axial end thereof. The outer cam wall 42 is axially longer than the wedge wall 43 and extends outwardly therebeyond whereby with the inside surface of the tube-end portion engaging the wedge wall 43 at 48, the outside diameter 27 of the contractable end portion of the sleeve will engage the cam wall 42, at an initial contact place, indicated by the reference character 47, which is spaced outwardly from the end of the tube. The cam wall 42 between the initial contact place 47 and the inner axial end thereof at 44 slopes to define an acute angle which resides in a range of approximately 8 to 12 degrees with respect to the longitudinal axis of the fitting. The wedge wall 43 preferably makes an angle with respect to the longitudinal axis of the fitting of approximately 25 degrees.

In assembly, the nut 14 forces the outside surface 27 of the contractable end portion of the sleeve against the cam wall 42 and cams the tube-end portion against the wedge wall 43 for self-flaring the tube-end portion into a self-flared tube-end portion. The wedge wall 43 supports the self-flared tube-end portion in opposition to said camming force. Further turning of the nut 14, with the annularly discontinuous contractable end portion 20 of the sleeve engaging the self-flared tube-end portion, forces the self-flared tube-end portion against the wedge wall 43 and effects a wedge fluid seal therebetween. The wedge fluid seal is effective in sealing high fluid pressures even though the self-flared tube-end portion is forced against the wedge wall 43 by the annularly discontinuous contractable end portion of the sleeve. The nut 14, in the final stages of turning, also forces the annularly discontinuous contractable end portion of the sleeve and the self-flared tube-end portion, as a unit, forwardly in between the cam wall 42 and the wedge wall 43. A "hit-home" feeling in turning the nut is experienced when the outside surface of the self-flared tube-end portion engages the cam wall at 50 where an annular bead is formed for effecting a tube-end fluid seal therebetween. The tube-end fluid seal and the wedge fluid seal constitute combined fluid seals for the tube fitting connection. In the "hit-home" condition, the opposed side walls of the slots substantially engage each other, circumferentially, at their inner axial ends, see FIGS. 1 and 7. It is also to be observed in FIG. 7 that, in the "hit-home" condition, the camming action tends to distort the biting edge 30 from its original transverse plane into a scalloped (arcuate) biting edge which aids in preventing rotation of the sleeve relative to the tube upon disassembly and re-assembly of the tube coupling connection. Thus, upon disassembly and re-assembly, the original "set" is maintained between the sleeve and the tube, which assures better sealing.

If the two fluid seals; namely, the wedge fluid seal and the tube-end fluid seal, should show any signs of leaking, it is because of an insufficient self-flare connection. Thus, my tube coupling connection invites a "leak" if there is an insufficient self-flare connection. Any fluid which would tend to leak past the two fluid seals is allowed to escape externally of the fitting through the slots 25 and serve as a signal to betray an insufficient self-flare connection which, of course, can be cured by tightening the nut.

In prior self-flare tube connections, it has been found that a greater portion of the wrench torque is employed to contract the annularly continuous sleeve about the tube, leaving very little wrench torque to make the self-flare connection. In my invention, the reverse is true, with the result that the nut 14 turns down easily until a "hit-home" feeling is experienced. With the nut 14 solidly bottomed, the spring fingers of the rearward portion 21 are caused to flex against the tube and make a collet-grip connection therewith to absorb tube vibrations. The diameter of the bore of the sleeve is approximately 0.005 inch greater than the diameter of the tube. Thus, the amount of the flexing of the collet-grip fingers against the tube is very small. Accordingly, the stresses are distributed substantially evenly over a wide annular band about the tube and cushion the tube against vibration. The biting edge 30 is thus kept from pressing against the tube.

Both the contractable end portion and the collet-grip portion of the sleeve provide a sustaining force reacting with the nut and thereby functioning as locking means to keep the nut from becoming loose. The sustaining force provided by the contractable end portion of the sleeve is that produced by the segmental fingers acting as longitudinally resilient sustaining columns and the sustaining force provided by the collet-grip portion of the sleeve is that produced by the segmental fingers acting as radially resilient sustaining levers.

Since my sleeve is double-ended, it may be reversibly used. In a one-ended sleeve, it sometimes happens that the assembly man may assemble the sleeve on the tube in a reverse direction, resulting in trouble. With my double-ended sleeve this trouble is obviated.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A tube fitting connection between a connection body and a tube-end portion of a tube having an inside and an outside annular surface, a selectably double-ended sleeve having a central body portion and first and second selectable contractable end portions, said tube-end portion extending beyond a selectable contractable end portion of said sleeve, said contractable end portions of said sleeve being annularly discontinuous and respectively having an inside and an outside surface and an axial end surface including a radially extending edge surface meeting with the inside surface of said sleeve to define a biting edge lying in a transverse plane to the longitudinal axis of said sleeve and capable of biting into the outside surface of said tube-end portion for effecting a self-flare connection with said connection body, said connection body including an axially directed inwardly converging annular walled chamber having an outer cam wall and an inner wedge wall both sloping inwardly toward each other at an acute angle relative to the longitudinal axis of said connection body, the inner axial ends of said outer cam wall and of said inner wedge wall integrally meeting each other and defining integral juncture wall means, the outer axial ends of said outer cam wall and said inner wedge wall having respectively diameters at least equal to the diameter of the outside surface of a selectable contractable end portion at the inner axial end thereof and no greater than the diameter of the inside surface of said tube-end portion at the inner axial end thereof, said outer cam wall being axially longer than said wedge wall and extending outwardly therebeyond whereby with said inside surface of said tube-end portion engaging said wedge wall said outside surface of said selectable contractable end portion of said sleeve will engage said cam wall at an initial contact place axially spaced outwardly from the inner axial end of said tube-end portion, said first and second contractable end portions of said sleeve respectively having a plurality of slot means defined by opposed longitudinally extending side walls beginning at the axial ends thereof and terminating within said central body portion thereof, said slot means rendering said biting edges annularly discontinuous, said central body portion of said sleeve having first and second selectable clamping shoulders on opposite sides thereof, force means for selectably engaging a selectable clamping shoulder for forcing the outside surface of a selectable contractable end portion of said sleeve against said cam wall and camming said tube-end portion against said wedge wall for self-flaring said tube-end portion into a self-flared tube-end portion, said wedge wall reinforced by said integral juncture wall means supporting said self-flared tube-end portion in opposition to said camming force, said force means with said selectable annularly discontinuous contractable end portion of said sleeve engaging said self-flared tube-end portion forcing said self-flared tube-end portion against said wedge wall for effecting a wedge fluid seal therebetween, said wedge fluid seal effectively sealing high fluid pressures even though said self-flared tube-end portion is forced against said wedge wall by an annularly discontinuous contractable end portion of said sleeve.

2. The structure of claim 1, wherein said force means also forces said selectable annularly discontinuous contractable end portion of said sleeve and said self-flared tube-end portion as a unit forwardly in between said cam wall and said wedge wall with said outside surface of said self-flared tube-end portion wedging itself against said cam wall and effecting a tube-end fluid seal therebetween, said tube-end fluid, seal and said wedge fluid seal constituting combined fluid seal means for said tube fitting connection.

3. The structure of claim 2, wherein said slot means in said selectable contractable end portion of said sleeve constitutes fluid passageway means whereby leakage fluid which may leak past said combined fluid seal means is allowed to escape externally of said tube fitting connection and serve as a signal to betray an insufficient self-flare connection.

4. The structure of claim 1, wherein said biting edge at the inner axial end of said selectable contractable end portion of said sleeve is distorted from said transverse plane under compression of said force means.

5. The structure of claim 1, wherein said contractable end portions respectively comprise a plurality of segmental finger means.

6. The structure of claim 1, wherein said sleeve includes a discontinuous annular extension wall respectively extending axially away from said annularly discontinuous biting edges.

7. The structure of claim 1, wherein said central body portion is annularly continuous, and wherein said slot means in said first and second selectable contractable end portions of said sleeve are annularly staggered with respect to each other.

8. The structure of claim 1, wherein said first and second contractable end portions respectively comprise a plurality of segmental fingers.

9. The structure of claim 8, wherein said force means comprises a nut and wherein said plurality of segmental fingers effecting said self-flare connection provide a longitudinal sustaining force reacting with said nut and thereby functioning as locking means to keep said nut from becoming loose, said longitudinal sustaining force being produced by said segmental fingers acting as longitudinal sustaining columns.

* * * * *